Aug. 27, 1963

L. T. BRINSON 3,101,617

EXHAUST TEMPERATURE DIFFERENTIAL CIRCUIT

Filed March 20, 1961

INVENTOR.
Leo T. Brinson,
BY Parker & Carter
Attorneys.

United States Patent Office 3,101,617
Patented Aug. 27, 1963

3,101,617
EXHAUST TEMPERATURE DIFFERENTIAL
CIRCUIT
Leo T. Brinson, Milwaukee, Wis., assignor to Nordberg
Manufacturing Company, Milwaukee, Wis., a corporation of Wisconsin
Filed Mar. 20, 1961, Ser. No. 96,737
5 Claims. (Cl. 73—341)

This invention is in the field of devices for checking the operation of the individual cylinders of an internal combustion engine having a given number of cylinders, for example 6, 8, 10 or 12 or any suitable number.

A primary object of my invention is a temperature measuring device which will indicate when any particular cylinder of an internal combustion engine is not functioning properly, for example carrying too much or too little load.

Another object is a method of checking the operation of the individual cylinders of an internal combustion engine to make sure that each and every cylinder is carrying its proportionate share of the load.

Another object is a temperature sensing arrangement which compares the average of the exhaust gas temperatures from all but one of the cylinders to the temperature of the exhaust gas from the said one cylinder.

Another object is a device of the above type which is constructed so that the exhaust gas temperature of any one cylinder may be compared to the mean of the temperatures of the exhaust gas from all of the other cylinders.

Another object is a device for comparing the mean of the temperatures of the exhaust gas from all of the cylinders to the temperature of the exhaust gas from any individual cylinder.

Another object is a device of the above type which is constructed to automatically energize an alarm, such as a bell, whistle, light or what have you, when the exhaust gas temperature of any individual cylinder varies by a predetermined amount from the thus obtained mean.

Other objects will appear from time to time in the ensuing specification and drawings in which.

Figure 1:
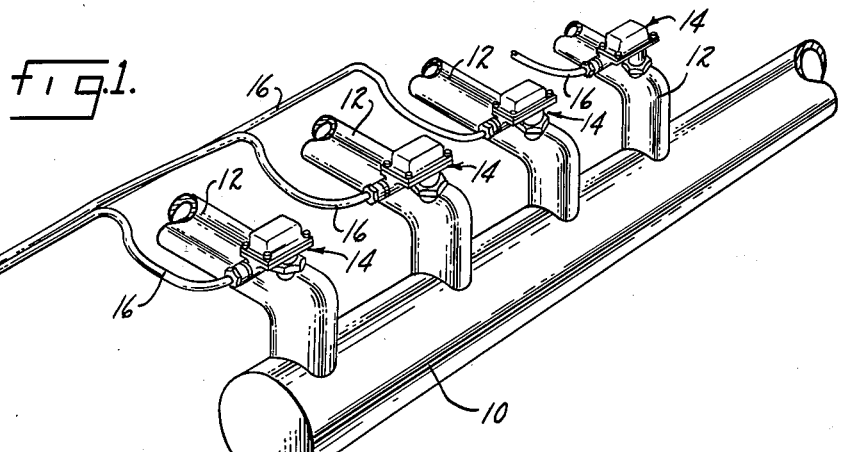
FIGURE 1 is a perspective of a temperature sensing arrangement for the exhaust gas of an internal combustion engine with a portion of the exhaust pipes and the exhaust manifold being shown.

In FIGURE 1, I have shown an exhaust manifold 10 connected to a suitable engine, not shown, by a collection of exhaust ducts or pipes 12. I position a thermocouple, indicated generally at 14, at a suitable location in each of the exhaust pipes 12. The hot end of each of the thermocouples is connected by suitable leads 16 to a differential temperature measuring arrangement, as shown for example in FIGURE 2.

In connection with FIGURE 1, suffice it to say that the engine may be any type, for example 2 or 4 cycle, diesel, dual fuel, gas spark-fired, or otherwise, supercharged or not, etc. In short, the details of the engine are unimportant to this invention.

Figure 2:
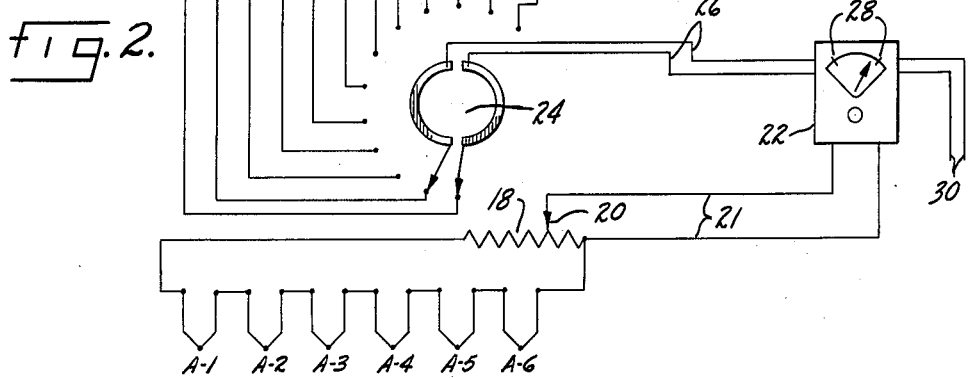
FIGURE 2 is a schematic wiring diagram of the preferred form of my invention.

As shown in FIGURE 2, I position a thermocouple, designated A–1 through A–6, in each of the exhaust ducts from the cylinders, one in each exhaust duct. While I have shown six thermocouples for use with a six cylinder engine, it should be understood that more or less may be used, depending upon the number of cylinders. Thermocouples A–1 through A–6 are shown as connected in series so that the individual voltages developed in each will add. The thermocouples, as a group, are then connected in series with a voltage dividing rheostat 18 or the like, or possibly a combination of resistors with an intermediate tap 20 which is in turn connected by suitable leads 21 to a suitable millivoltmeter 22 or the like. In the arrangement shown, the tap 20 would cover ⅙ of the total resistance 18 so that, in effect, it divides the total output voltage of the six thermocouples by six, and thereby obtains an average or mean which will be reflected in the millivoltmeter 22.

I position a second thermocouple in each of the exhaust pipes, designated B–1 through B–6 in FIGURE 2, it being understood that each of the second group of thermocouples is located directly next to one of the first groups. Or they may be paired and in the same holder.

In other words, A–1 and B–1 go in the first exhaust pipe, A–2 and B–2 in the second exhaust pipe, etc. Thus, A–1 and B–1 will read the same temperature as will A–2 and B–2, etc. The second group, B–1 through B–6, leads to a selector switch 24 which may be operated electrically, mechanically, hydraulically, pneumatically, manually or otherwise, so that any one of the second group can be connected by suitable leads 26 to the millivoltmeter 22.

In the millivoltmeter the voltage received from leads 21 has its electrical polarity opposed to the electrical polarity of the output from the selector switch. The millivoltmeter is connected in such a manner that it indicates the difference between the average output from A–1 through A–6 and the individual output of B–1 through B–6, depending upon the position of selector switch 24. Thus, if the voltage from, say, thermocouple B–1 is equal to the average from A–1 through A–6, the millivoltmeter 22 will read zero.

I prefer to set up a certain range or limits of variation so that, depending upon the amount of variation of the temperature in each exhaust pipe, as indicated by thermocouples B–1 through B–6, the cylinders may be monitored one at a time and if the temperature of a particular cylinder varies from the mean by an amount in excess of the predetermined limits, an automatic alarm, such as a signal, bell, light or otherwise, or a suitable control, or possibly a recorder or computer or the like, will be energized to indicate, record, correct, etc. faulty operation. For example, I may provide the millivoltmeter with contacts 28 such that if the needle swings too far one way or the other, a contact will be made which will send a signal through suitable leads 30 to an alarm of any suitable type, not shown. The limits 28 may be adjustably positioned so that the amount or range of variation may be varied depending upon the particular installation.

Figure 3:
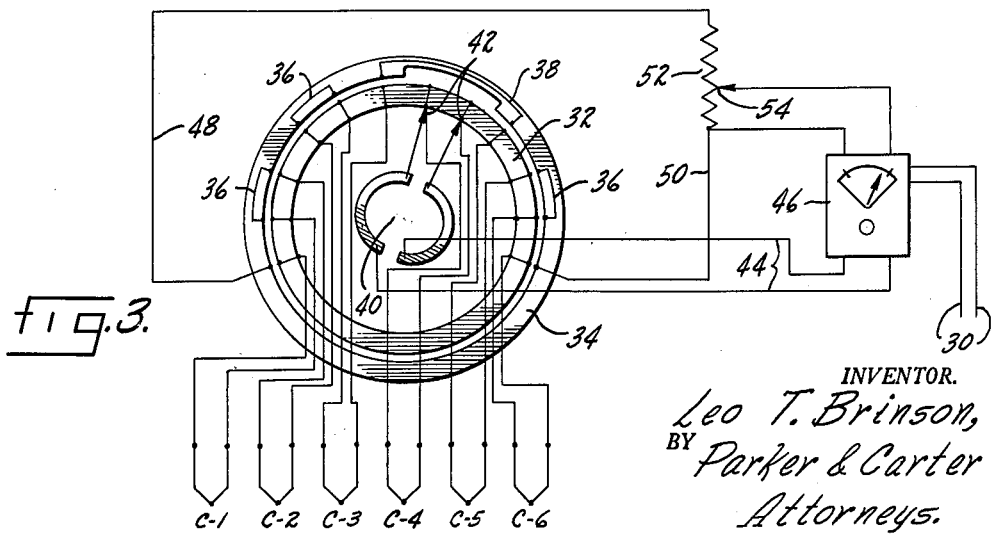
FIGURE 3 is a wiring diagram of a variation.

A modification is shown in FIGURE 3 in which six thermocouples C–1 through C–6 are positioned, as before, in the individual exhaust pipes with connections from each running to a stator 32 which is surrounded in turn by a rotor 34. The rotor has a series of connections 36 which are constructed to connect the thermocouples C–1 through C–6 in series and one skip connection 38 to bypass one thermocouple. Opposite the skip connection 38 and within the stator, I position a selector switch 40 which is preferably mounted to rotate with the rotor and having its points 42 opposite the skip connection 38 so that when the connections on the rotor skip a particular thermocouple, shown as C–4 in FIGURE 3, that particular thermocouple will be picked up by the selector switch and in turn connected by leads 44 to a suitable millivoltmeter 46. The sum of the voltages from the remaining thermocouples, in this case C–1, C–2, C–3, C–5 and C–6, would be brought by suitable leads 48 and 50 to a resistance 52 having an intermediate tap 54, like 18 and 20 in FIGURE 2, which in turn is connected to the millivoltmeter 46.

The result is that the voltages from all of the thermocouples, except one, will be averaged through the resistance 52 and tap 54 and balanced against the voltage from the one remaining thermocouple in the millivoltmeter 46. As before, an alarm, control, recorder, etc. circuit may be energized when the difference between the voltage of the selected cylinder and the average of the remaining temperatures exceeds certain preset limits—possibly adjustable—in the volt meter.

The use, operation and function of my invention are as follows:

I provide a method and apparatus for automatically sensing the exhaust gas temperature from any one of the cylinders of an internal combustion engine and comparing it to the average of all or most all of the temperatures from the other cylinders.

The exhaust gas temperature is a direct indication of the load a particular cylinder is carrying. If the exhaust gas temperature of all cylinders is approximately the same, this indicates that all cylinders are carrying approximately the same load, each carrying its proportionate share, which is desirable. However, if the exhaust gas temperature of any given cylinder is perceptibly different from the average of the others, either substantially higher or substantially lower, that cylinder is not functioning properly and may be the cause of breakdown or failure. The above is true regardless of whether the engine is operating at high, intermediate or low loads, the only difference being that the average temperature will be higher at the high loads than it will be at low loads. But the relationship, nevertheless, remains the same.

In the FIGURE 2 form, I position two thermocouples in each exhaust pipe, each reading the temperature of the exhaust gases and generating a voltage in accordance with that temperature. One set of thermocouples has its voltages added and then divided, through a voltage dividing rheostat or otherwise, which is in turn connected to a millivoltmeter or the like, which will, therefore, reflect the average of all of the cylinders. The other set of thermocouples is connected through a selector switch to the millivoltmeter with its electrical polarity opposite the electrical polarity of the average. Assuming that the temperature of any given cylinder, as shown by the voltage from any one of B-1 through B-6, is the same as the average temperature, as indicated by the average voltage from A-1 through A-6, the two outputs to the indicator 22 will balance and cancel each other, giving a zero reading. However, if the output from any one of B-1 through B-6 varies from the average, the meter will read either positive or negative. I may use an automatic alarm, but it is not essential.

I may compare the temperature of each cylinder to the average of all of the other cylinders, as shown in FIGURE 3, which is sufficiently accurate for satisfactory results. Again, the same averaging and meter arrangement may be used.

The point is that I compare the exhaust gas temperature of each cylinder to the average of all or almost all of the remaining cylinders to check the performance of each individual cylinder. I may do this on a periodic monitoring basis, or merely by a spot check. The same null balance principle applies in both FIGURES 2 and 3.

While I have shown and described the preferred form and one variation of my invention, it should be understood that numerous other modifications, substitutions, changes and alterations may be made without departing from the invention's fundamental theme. I, therefore, wish that the invention be unrestricted, except as by the appended claims.

I claim:

1. A method of temperature testing any one of a plurality of heat sensitive operating points, including the steps of selecting any one of the points to be tested, individually and simultaneously sensing the temperature at each of the points, averaging the thus sensed temperatures from not less than all of the non-selected points, comparing the thus derived average temperature with the temperature sensed at the selected one point, and performing the last three steps simultaneously, said average temperature including only those temperatures from the non-selected points.

2. A means for temperature testing any one of a plurality of heat sensitive operating points, including a plurality of temperature sensing means, one at each of said operating points for simultaneously sensing the temperature at each point, means for selecting any one of said temperature sensing means, means for averaging the thus sensed temperatures, as they are sensed, from at least all of the non-selected points, and means for comparing the average temperature with the temperature sensed at the selected one point, simultaneously as said temperatures are sensed and averaged.

3. The structure of claim 3 further characterized in that all of the temperatures are included in the average temperature.

4. The structure of claim 3 further characterized in that only the non-selected temperatures are included in the average.

5. The structure of claim 3 further characterized by and including an alarm, and means for energizing the alarm when the temperature at any one point varies, by a predetermined amount, from the average temperature.

References Cited in the file of this patent

UNITED STATES PATENTS

| | | |
|---|---|---|
| 903,090 | Hopkins | Nov. 3, 1908 |
| 1,494,586 | Cary | May 20, 1924 |
| 2,444,421 | Boston | July 6, 1948 |
| 2,463,566 | Saldin | Mar. 8, 1949 |
| 2,504,931 | Knudsen | Apr. 18, 1950 |
| 2,875,613 | Neal | Mar. 13, 1959 |